(12) United States Patent
McDermot et al.

(10) Patent No.: US 12,554,116 B2
(45) Date of Patent: *Feb. 17, 2026

(54) VIEWING OPTIC WITH CONTOURS

(71) Applicant: Sheltered Wings, Inc., Barneveld, WI (US)

(72) Inventors: Connor McDermot, Barneveld, WI (US); Jordan Blok, Barneveld, WI (US); Jesse Lenz, Barneveld, WI (US)

(73) Assignee: Sheltered Wings, Inc., Barneveld, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/167,391

(22) Filed: Feb. 10, 2023

(65) Prior Publication Data
US 2024/0027743 A1 Jan. 25, 2024

Related U.S. Application Data

(63) Continuation of application No. 17/150,189, filed on Jan. 15, 2021, now Pat. No. 11,579,431.

(60) Provisional application No. 62/961,447, filed on Jan. 15, 2020.

(51) Int. Cl.
*G02B 23/16* (2006.01)
*F41G 1/38* (2006.01)

(52) U.S. Cl.
CPC ............. *G02B 23/16* (2013.01); *F41G 1/38* (2013.01)

(58) Field of Classification Search
CPC ............. G02B 23/16; G02B 23/00; F41G 1/38
See application file for complete search history.

(56) References Cited

U.S. PATENT DOCUMENTS

| | | | |
|---|---|---|---|
| 4,200,355 A | 4/1980 | Williams, Jr. | |
| D275,495 S * | 9/1984 | Tominaga | D16/132 |
| D305,030 S * | 12/1989 | Fukushima | D16/132 |
| D308,981 S * | 7/1990 | Moore | D16/132 |
| D308,982 S * | 7/1990 | Moore | D16/132 |
| 5,363,559 A | 11/1994 | McCarty | |
| 5,813,107 A | 9/1998 | Chen | |
| 9,322,616 B2 | 4/2016 | Craven et al. | |
| RE46,011 E * | 5/2016 | Huber | F41G 1/38 |
| D862,558 S * | 10/2019 | Larsson | D16/132 |
| 10,458,752 B1* | 10/2019 | Szalony | F41G 1/38 |
| 2003/0115981 A1* | 6/2003 | Stoianovici | F16H 1/163 74/425 |
| 2006/0179702 A1* | 8/2006 | York | F41G 1/38 42/122 |
| 2006/0268433 A1* | 11/2006 | Thomas | F41G 11/004 359/811 |
| 2009/0000176 A1 | 1/2009 | Robitaille | |
| 2010/0309570 A1* | 12/2010 | Tsuno | G02B 23/16 359/851 |
| 2016/0028970 A1* | 1/2016 | Masarik | F41G 1/36 348/341 |
| 2016/0061567 A1 | 3/2016 | Regan et al. | |
| 2017/0254615 A1 | 9/2017 | Kennair, Jr. | |

(Continued)

OTHER PUBLICATIONS

International Search Report and Written Opinion for International Application No. PCT/US21/13596, dated Jun. 3, 2021, 20 pages.

*Primary Examiner* — Joshua E Freeman
(74) *Attorney, Agent, or Firm* — Husch Blackwell LLP

(57) ABSTRACT

A main body of a viewing optic comprising at least one void in the main body.

6 Claims, 3 Drawing Sheets

(56) References Cited

U.S. PATENT DOCUMENTS

| | | |
|---|---|---|
| 2017/0255000 A1* | 9/2017 | Öttl ..................... G02B 25/001 |
| 2019/0324260 A1 | 10/2019 | Hamilton et al. |
| 2019/0376765 A1* | 12/2019 | Hamilton ............... G02B 7/023 |
| 2020/0049455 A1 | 2/2020 | Hamilton et al. |
| 2020/0056859 A1* | 2/2020 | Walker .................. G02B 23/16 |
| 2020/0326155 A1* | 10/2020 | Hamilton ............... G02B 23/16 |
| 2020/0355904 A1 | 11/2020 | Havens et al. |
| 2021/0173480 A1 | 6/2021 | Osterhout et al. |
| 2021/0348886 A1 | 11/2021 | Havens et al. |

* cited by examiner

VIEWING OPTIC WITH CONTOURS

CROSS-REFERENCE TO RELATED APPLICATIONS

This application is a continuation patent application of U.S. patent application Ser. No. 17/150,189 filed Jan. 15, 2021, which claims priority to and is a nonprovisional application of U.S. Provisional Application No. 62/961,447 filed Jan. 15, 2020, which is incorporated herein by reference in its entirety.

FIELD

The disclosure relates to viewing optics. In one embodiment, the disclosure relates to a riflescope tube. In one embodiment, the disclosure relates to a riflescope tube having contours, which reduce weight compared to conventional riflescope tubes.

BACKGROUND

Today is the age of unprecedented technology—technology that makes our lives easier and more connected at the push of a touch-screen and glace of a monitor. For shooters, civilian or military, this is no less true. Shooters carry numerous components, each adding critical weight to gear bags. For the military, specifically, ruggedized (and oftentimes heavier) equivalents provide tactical awareness, allowing soldiers and Marines to see beyond their personal sight using GPS, smartphones, tablets, and even helmet-mounted screens. For shooters, one of the most significant limitations, and perhaps the most significant limitation for our soldiers, is how much they can carry, and thus, reducing the weight of each and every component is important.

Today the average US soldier carries at least 60 pounds of gear, with an extended patrol often doubling that weight. Specialized warfighters, such as Automatic Riflemen, Combat Medics, and Special Operations can see totals much higher. The average U.S. solider will have protective clothing, body armor and helmets, load carrying equipment, and a nick.

The bane of every soldier's and marine's existence, the rucksack can come in many different shapes and sizes, from a large pack that holds 100+ pounds of gear to a more modestly-sized patrol pack that holds 20 to 30 pounds of gear. The longer the duration and more specialized the soldier, the more gear that needs to be carried, especially if you're stepping out of an airplane inside enemy territory. In addition, the modern US soldier is bedecked in electronics, from night vision to radios, and new technology is coming using smartphones, tablets, and GPS.

The world has never seen better equipped warfighters, but it's now become clear that they are overburdened as well. The US Armed Forces and the Department of Defense have spearheaded initiatives to reduce weight in all categories, from case-less ammo to solar power.

Civilian shooters carry significantly lighter loads on average, but civilian shooters often prioritize certain pieces of gear over others in order to reduce the total load or avoid carrying a larger or secondary bag, resulting in a less-than-optimal set-up in some conditions.

For the reasons discussed above, having a viewing optic with reduced weight is advantageous. Thus, there is a large need for a viewing optic that addresses these concerns.

SUMMARY

In one embodiment, the disclosure provides a main body of a viewing optic. In accordance with embodiments of the present disclosure, a main body of a viewing optic comprises at least one void in the main body.

In a further embodiment, the main body includes a saddle portion having a top side, a bottom side, a left side and a right side, and the at least one void is in the saddle portion. In an embodiment, the main body has at least two voids on a surface of the saddle portion. In another embodiment, the main body has a plurality of voids on the saddle portion. In an embodiment, the voids are symmetrically positioned about the saddle portion.

In an embodiment, the plurality of voids comprises a first plurality of voids having a first geometry and at least one void having a second geometry. In a further embodiment, at least one of the first and second geometry is a pocket having a generally triangular profile. In yet a further embodiment, the other of the first and second geometry is a channel.

In another embodiment, the saddle portion comprises eight voids having the first geometry and four voids having the second geometry, wherein one of the eight voids of the first geometry is positioned at each of the top front right, top front left, top back right, top back left, bottom front right, bottom front left, bottom back right and bottom back left portions of the saddle, and wherein a void of the second geometry connects the top front right and top back right voids of the first geometry, the top front left and top back left voids of the first geometry, the bottom front right and bottom back right voids of the first geometry, and the bottom front left and bottom back left voids of the first geometry. In a further embodiment, the voids are symmetrically positioned about the saddle.

In an embodiment, the saddle portion has a weight which is at least 2% less than the weight of an identical saddle portion without the plurality of voids. In a further embodiment, the saddle portion has a weight from 0.1 oz to 1.0 oz less than that of an identical saddle portion without the plurality of voids.

In an embodiment, the at least one void is on the top side. In a further embodiment, the at least one void is on the bottom side. In yet a further embodiment, the at least one void is on the left side. In still a further embodiment, the at least one void is on the right side.

In another embodiment, the disclosure provides a viewing optic. In accordance with embodiments of the present disclosure, the viewing optic comprises a main body comprising at least one void. In an embodiment, the viewing optic is a riflescope.

In another embodiment, the present disclosure provides a method of machining at least one void in a scope body comprising inserting a scope tube blank into a CNC mill; indexing the blank at 45 degrees off its normal axis; and machining, using an end mill, at least one void perpendicular to an axis of the end mill. In a further embodiment, the method further comprises indexing the blank 90 degrees; machining, using the end mill, at least one void perpendicular to the axis of the end mill; and repeating the indexing and machining steps two further times.

BRIEF DESCRIPTION OF THE DRAWINGS

Embodiments of the disclosure are disclosed with reference to the accompanying drawings and are for illustrative purposes only. The disclosure is not limited in its application to the details of construction or the arrangement of the components illustrated in the drawings. The disclosure is capable of other embodiments or of being practiced or carried out in other various ways. Like reference numerals are used to indicate like components. In the drawings.

Figure 1:
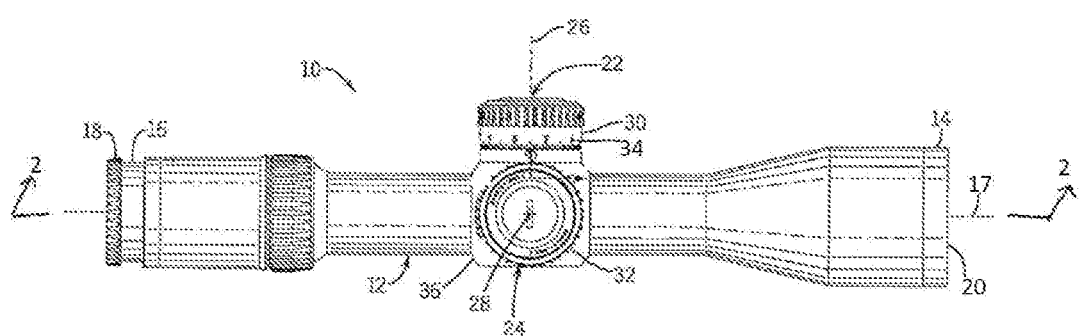
FIG. 1 is a side view of an embodiment of a riflescope in accordance with embodiments of the present disclosure.

Before explaining embodiments of the disclosure in detail, it is to be understood that the disclosure is not limited in its application to the details of construction and the arrangement of the components set forth in the following description or illustrated in the drawings. The technology of this present disclosure is capable of other embodiments or being practiced or carried out in various ways. Also, it is to be understood that the phraseology and terminology employed herein is for the purpose of description and should not be regarded as limiting.

DETAILED DESCRIPTION

The apparatuses and methods disclosed herein will now be described more fully hereinafter with reference to the accompanying drawings, in which embodiments of the disclosure are shown. The apparatuses and methods disclosed herein may, however, be embodied in many different forms and should not be construed as limited to the embodiments set forth herein. Rather, these embodiments are provided so that the disclosure will be thorough and complete and will fully convey the scope of the invention to those skilled in the art.

It will be appreciated by those skilled in the art that the set of features and/or capabilities may be readily adapted within the context of a standalone weapons sight, front-mount or rear-mount clip-on weapons sight, and other permutations of filed deployed optical weapons sights. Further, it will be appreciated by those skilled in the art that various combinations of features and capabilities may be incorporated into add-on modules for retrofitting existing fixed or variable weapons sights of any variety.

It will be understood that when an element or layer is referred to as being "on", "connected to" or "coupled to" another element or layer, it can be directly on, connected or coupled to the other element or layer. Alternatively, intervening elements or layers may be present. In contrast, when an element is referred to as being "directly on," "directly connected to" or "directly coupled to" another element or layer, there are no intervening elements or layers present.

Like numbers refer to like elements throughout. As used herein, the term "and/or" includes any and all combinations of one or more of the associated listed items.

It will be understood that, although the terms first, second, etc. may be used herein to describe various elements, components, regions, and/or sections, these elements, components, regions, and/or sections should not be limited by these terms. These terms are only used to distinguish one element, component, region, or section from another element, component, region, or section. Thus, a first element, component, region, or section discussed below could be termed a second element, component, region, or section without departing from the disclosure.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

The term "and/or" as used in a phrase such as "A and/or B" herein is intended to include both A and B; A or B; A (alone); and B (alone). Likewise, the term "and/or" as used in a phrase such as "A, B, and/or C" is intended to encompass each of the following embodiments: A, B, and C; A, B, or C; A or C; A or B; B or C; A and C; A and B; B and C; A (alone); B (alone); and C (alone).

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, melt index, temperature, etc., is from 100 to 1,000, it is intended that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, relative amounts of distances from a user of a device to a target, weights, percentages (e.g., of weight reduction) and other measurements.

All patents, patent applications, and non-patent literature references are incorporated herein in their entireties.

As used herein, an "erector tube" is any structure or device having an opening to receive an erector lens mount.

As used herein, a "firearm" is a portable gun, being a barreled weapon that launches one or more projectiles often driven by the action of an explosive force. As used herein, the term "firearm" includes a handgun, a long gun, a rifle, shotgun, a carbine, automatic weapons, semi-automatic weapons, a machine gun, a sub-machine gun, an automatic rifle, and an assault rifle.

As used herein, the term "viewing optic" refers to an apparatus used by a shooter or a spotter to select, identify or monitor a target. The "viewing optic" may rely on visual observation of the target, or, for example, on infrared (IR), ultraviolet (UV), radar, thermal, microwave, or magnetic imaging, radiation including X-ray, gamma ray, isotope and particle radiation, night vision, vibrational receptors including ultra-sound, sound pulse, sonar, seismic vibrations, magnetic resonance, gravitational receptors, broadcast frequencies including radio wave, television and cellular receptors, or other image of the target. The image of the target presented to the shooter by the "viewing optic" device may be unaltered, or it may be enhanced, for example, by magnification, amplification, subtraction, superimposition, filtration, stabilization, template matching, or other means. The target selected, identified or monitored by the "viewing optic" may be within the line of sight of the shooter, or tangential to the sight of the shooter, or the shooter's line of sight may be obstructed while the target acquisition device presents a focused image of the target to the shooter. The image of the target acquired by the "viewing optic" may be, for example, analog or digital, and shared, stored, archived, or transmitted within a network of one or more shooters and spotters by, for example, video, physical cable or wire, IR, radio wave, cellular connections, laser pulse, optical, 802.11b or other wireless transmission using, for example, protocols such as html, SML, SOAP, X.25, SNA, etc., Bluetooth™, Serial, USB or other suitable image distribution method. The term "viewing optic" is used interchangeably with "optic sight."

As used herein, the term "shooter" applies to either the operator making the shot or an individual observing the shot in collaboration with the operator making the shot.

The disclosure relates to viewing optic with reduced weight. In one embodiment, the disclosure relates to a viewing optic with a main body having pockets in the turret saddle. The disclosure is not limited to these embodiments.

Figure 2:
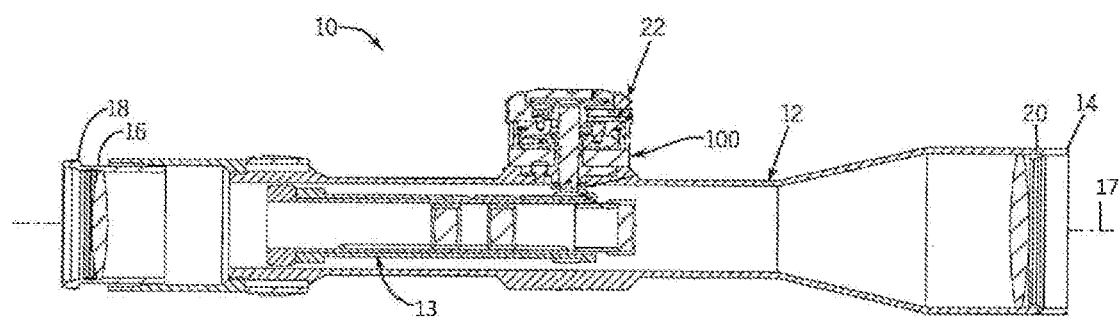
FIG. 2 is a cross-sectional view of the turret of FIG. 1 taken along line 2-2 in accordance with embodiments of the present disclosure.

FIGS. 1-2 illustrate a rifle scope 10, generally, in accordance with embodiments of the disclosure. The rifle scope 10 has a body 12 that encloses a movable optical element 13, which is an erector tube. The scope body 12 is an elongate tube having a larger opening at its front 14 and a smaller opening at its rear 16. An eyepiece 18 is attached to the rear of the scope body 12, and an objective lens 20 is attached to the front of the scope body 12. The center axis of the movable optical element 13 defines the optical axis 17 of the rifle scope 10.

An elevation turret 22 and a windage turret 24 are two knobs in the outside center part (or saddle 100) of the scope body 12. The turrets 22, 24 are marked in increments by indicia 34 on their perimeters 30 and 32 and are used to adjust the elevation and windage of the movable optical element 13 for points of impact change. These knobs 22, 24 protrude from the turret housing 36. The turrets 22, 24 are arranged so that the elevation turret rotation axis 26 is perpendicular to the windage turret rotation axis 28. Indicia typically include tick marks, each corresponding to a click, and larger tick marks at selected intervals, as well as numerals indicating angle of adjustment or distance for bullet drop compensation.

The movable optical element 13 is adjusted by rotating the turrets one or more clicks. A click is one tactile adjustment increment on the windage or elevation turret of the rifle scope 10, each of which corresponds to one of the indicial 34. In the current embodiment, one click changes the scope's point of impact by 0.1 milliradians (mrad). However, the turrets, systems and concepts disclosed herein can be used with other measures of increments. In other embodiments, the increments can be minutes of angle (MOA) increments.

FIGS. 3-6 show the saddle portion 100 of the scope body 12 in further detail. The saddle 100 includes a plurality of voids 50. As used herein, a "void" refers to a volume of an otherwise solid object from which material has been removed to create an area having an absence of material. Voids may include pockets, depressions, hollows, channels, indentations, notches, and similar features, whether or not completely surrounded or exposed on the outer surface of the saddle 100. In the specific embodiment show, the voids 50 include at least a plurality of pockets 50a and/or plurality of channels 50b. In an embodiment, two or more pockets 50a may be connected by one or more channels 50b.

In an embodiment, the saddle 100 can have voids 50 on top 101, bottom 102, left 103 and/or right 104 sides. In an embodiment, the saddle 100 can have voids 50 on only the top 101 and/or bottom 102 sides. In another embodiment, the saddle 100 can have voids 50 on only the left 103 and/or right 104 sides. In a further embodiment, the saddle 100 can have one or more voids 50 on each of the top 101, bottom 102, left 103 and right 104 sides.

In an embodiment, the saddle 100 can have voids in a symmetrical or asymmetrical, though preferably symmetrical, arrangement. In the embodiment shown in FIGS. 3-6, the optical axis 17 forms a horizontal (relative to the orientation shown in FIGS. 4 and 5) line of symmetry, and axis A forms a vertical line of symmetry. In one embodiment, the voids 50 are symmetrically disposed on the saddle 50 relative to the optical axis 17. In another embodiment, the voids 50 are symmetrically disposed on the saddle 50 relative to axis A. In another embodiment, the voids 50 are symmetrically disposed on the saddle 50 relative to both the optical axis 17 and axis A.

In another embodiment, the saddle 100 can have an even number of voids or an odd number of voids. Further, in an embodiment, the saddle 100 may have two or more voids that are identical in geometry (e.g., shape and volume). In another embodiment, the saddle 100 may have two or more voids that have different geometries. In another embodiment, the saddle 100 may have three or more voids, with three or more different geometries. In a particular embodiment, the saddle 100 includes two or more voids of two different geometries.

In an embodiment, the saddle 100 includes at least a plurality of voids 50 having a first geometry and at least a plurality of voids 50 having a second geometry. The number of voids 50 having a first geometry may be greater than or equal to the number of voids 50 having a second geometry.

Figure 4:
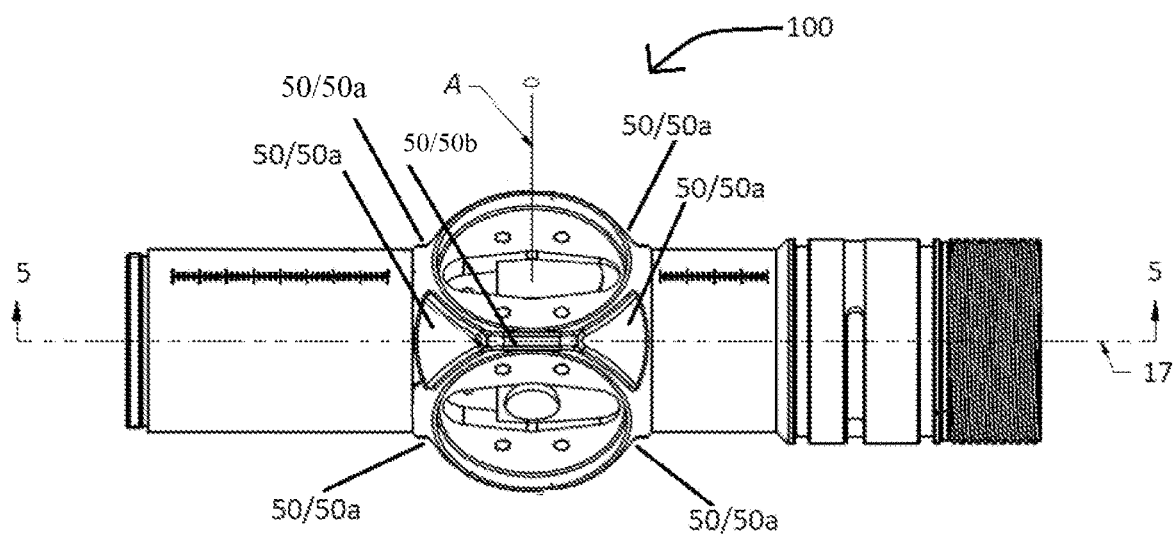
FIG. 4 is a 45° rotated side view of the turret saddle portion of a riflescope with the adjustment knobs removed for clarity in accordance with embodiments of the present disclosure.
Figure 5:
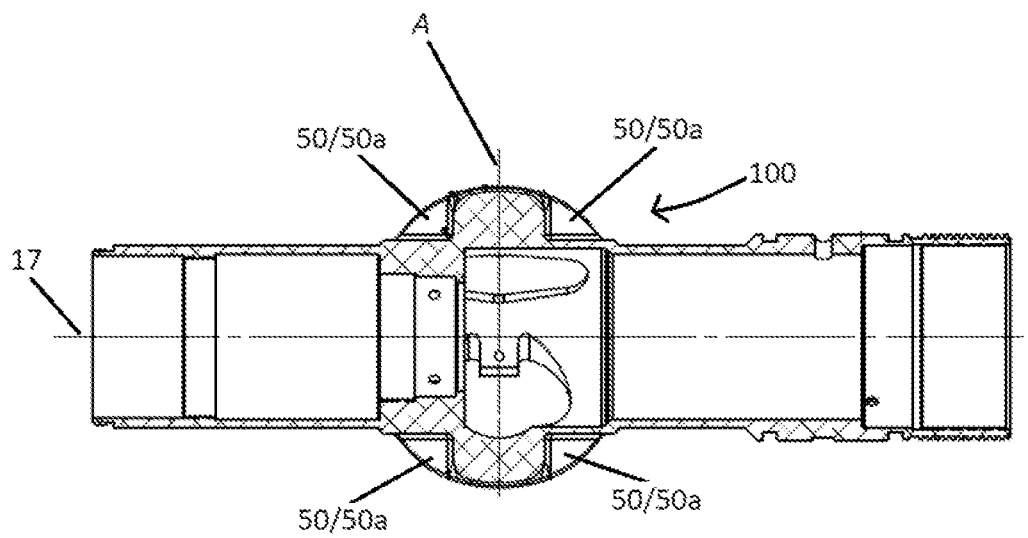
FIG. 5 is a cross-sectional view of the turret saddle portion of FIG. 3 taken along line 5-5 in accordance with embodiments of the present disclosure.
Figure 6:
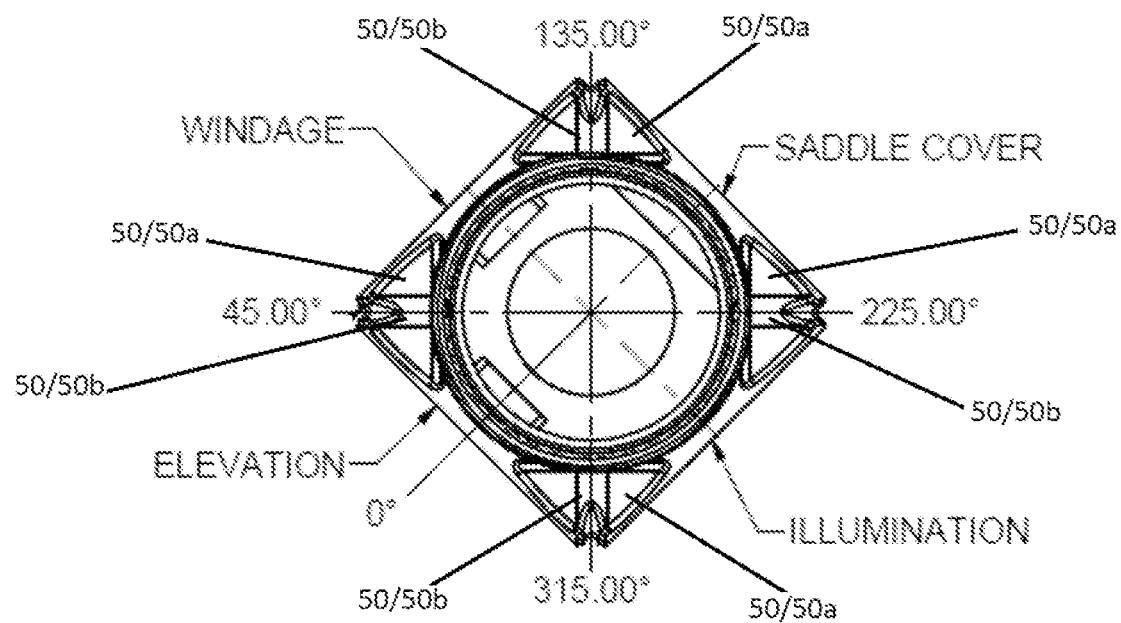
FIG. 6 is a schematic showing the orientation of pockets in the main body of the riflescope in relationship to the primary axis in accordance with embodiments of the present disclosure.

In particular, and with reference to FIGS. 4 and 6, the voids 50 are mirrored about axis A, which is perpendicular to axis 17, and rotated equally spaced around the axis 17. In the embodiment shown, there are a total of eight (8) pockets 50a and four (4) channels 50b. One each of the pockets 50a is found at the "corners" of the saddle 100, while the channels 50b connect the front and back channels on the upper right of the saddle 100, the front and back channels on the upper left of the saddle 100, the front and back channels on the bottom right of the saddle 100, and the front and back channels on the bottom left of the saddle 100. With reference to FIG. 1, it can be seen that, in the specific embodiment described, one or more voids 50 (or more specifically, channels 50b) may form a contour between turrets 22, 24.

Figure 3:
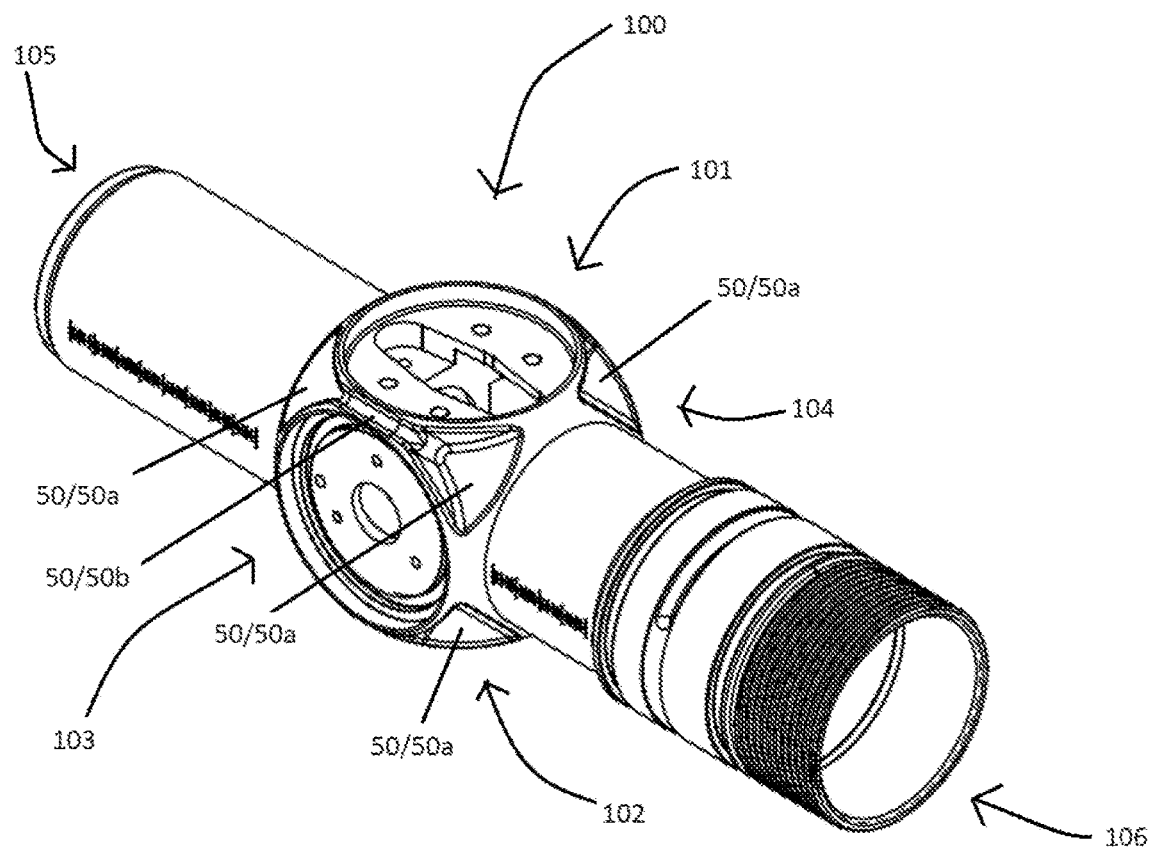
FIG. 3 is a perspective view of the saddle portion of a riflescope with the adjustment knobs removed for clarity in accordance with embodiments of the present disclosure.

With reference to FIGS. 3 and 4, the pockets 50a are shown as generally triangular in profile and having a depth into the surface of the saddle 100. Similarly, the channels 50b are shown as being generally linear with a rounded cross-section. It will be appreciated that other shapes and void geometries may be used.

The voids 50 together serve to reduce the overall weight of the riflescope 10. By removing material that does not affect the function or structural integrity of the riflescope 10, the overall weight of the structure is reduced. In an embodiment, the weight of the main body 12 of the riflescope 10 containing voids is reduced by at least 2%, or at least 3%, or at least 4%, or at least 5%, or at least 6%, or at least 7%, or at least 8%, or at least 9%, or at least 10%, compared to an identical main body having no voids. In an embodiment, the weight of the main body 12 of the riflescope 10 containing voids is reduced by 2%, or 3%, or 4%, or 5% to 6%, or 7%, or 8%, or 9%, or 10% to 15%, compared to an identical main body having no voids. In a particular embodiment, the weight of the main body 12 of the riflescope 10 is reduced by 3% as compared to the weight of a main body of a riflescope to identical dimensions.

In an embodiment, the weight of the main body 12 of the riflescope 10 is reduced from 0.1 oz, or 0.2 oz, or 0.3 oz, or 0.4 oz, or 0.5 oz to 0.6 oz, or 0.7 oz, or 0.8 oz, or 0.9 oz, or 1.0 oz, or 1.5 oz. In a particular embodiment, the weight of the main body 12 of the riflescope 10 is reduced by 0.51 oz as compared to the weight of a main body of a riflescope to identical dimensions.

In addition to the utility of weight savings, the design of voids 50 about the saddle 100 can serve as a quick and unique optical identity. That is, the voids 50 may be designed such to provide a distinct visual identification of the riflescope. Having the ability to identify a product by a specific visual feature other than logos can provide a competitive advantage by allowing bystanders and social media user to positively identify an optic an influencer is using without the need of that influencer to specifically callout the optic.

In the embodiments shown, the voids 50 are machined into the saddle 100. However, in further embodiments, the voids 50 may be created using other technologies, including, but not limited to, laser technologies, and even manually.

In an embodiment, the disclosure provides a method for machining a main body, and particularly a saddle, of a riflescope.

To machine these features, the scope tube blank is mounted into a CNC mill with a $4^{th}$ axis rotary table. The part was indexed 45 degrees off its normal axis, as shown in FIG. 6. In FIG. 6, the 0-degree position is identified, along with the 45-degree, 135-degree, 225-degree and 315-degree positions. The spaces for the windage turret (not shown) and elevation turret (not shown), as well as the saddle cover (not shown) and illumination control (not shown) are also marked for clarity; however, it will be understood that the arrangement of these components may be altered for some uses (e.g., opposite dominate hand) and/or other adjustment mechanisms provided. Using a flat end mill, a majority of material was removed from the two pockets 50a perpendicular to the axis of the end mill. A ball end mill was then used to machine in the final shape and contours of the pockets 50a. The same ball end mill then cut the connecting channel 50b and blending contours between these two pockets 50a. The $4^{th}$ axis rotary table indexed the scope tube another 90 degrees and machined the next set of pockets 50a and channels 50b. This was repeated for the final two sets of pockets 50a and channels 50b.

It will be appreciated that the above method describes a method for machining the specific exemplary main body 12, and particularly the specific exemplary saddle portion 100, shown and described with references to the figures. As discussed with reference to FIGS. 1-6, the number, geometry and positioning of voids on the saddle 100 may vary within the scope of this disclosure, and the method of machining may be modified accordingly.

Various modifications and variations of the described compositions and methods of the invention will be apparent to those skilled in the art without departing from the scope and spirit of the invention. One skilled in the art will recognize at once that it would be possible to construct the present invention from a variety of materials and in a variety of different ways. Although the invention has been described in connection with specific preferred embodiments, it should be understood that the invention should not be unduly limited to such specific embodiments. While the preferred embodiments have been described in detail, and shown in the accompanying drawings, it will be evident that various further modification are possible without departing from the scope of the invention as set forth in the appended claims. Indeed, various modifications of the described modes for carrying out the invention which are obvious to those skilled in marksmanship or related fields are intended to be within the scope of the following claims.

What is claimed is:

1. A main body of a viewing optic comprising: a saddle portion having a top side, a bottom side, a left side, and a right side, and eight voids having a first geometry and four voids having a second geometry, wherein one of the eight voids of the first geometry is positioned at each of the top front right, top front left, top back right, top back left, bottom front right, bottom front left, bottom back right and bottom back left portions of the saddle, and wherein a void of the second geometry connects the top front right and top back right voids of the first geometry, the top front left and top back left voids of the first geometry, the bottom front right and bottom back right voids of the first geometry, and the bottom front left and bottom back left voids of the first geometry.

2. The main body of claim 1, wherein the voids are symmetrically positioned about the saddle.

3. The main body of claim 1, wherein the saddle portion has a weight that is at least 2% less than the weight of an identical saddle portion without the plurality of voids.

4. The main body of claim 1, wherein the saddle portion has a weight from 0.1 oz to 1.0 oz less than that of an identical saddle portion without the plurality of voids.

5. A viewing optic having the main body of claim 1.

6. The viewing optic of claim 5, wherein the viewing optic is a riflescope.

* * * * *